(12) United States Patent
Downing et al.

(10) Patent No.: US 7,840,714 B2
(45) Date of Patent: Nov. 23, 2010

(54) MAPPING SDVO FUNCTIONS FROM PCI EXPRESS INTERFACE

(75) Inventors: Sylvia J. Downing, El Dorado Hills, CA (US); Paul A. Jolly, Rescue, CA (US); Adam H. Wilen, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 1581 days.

(21) Appl. No.: 10/746,023

(22) Filed: Dec. 24, 2003

(65) Prior Publication Data

US 2005/0172037 A1    Aug. 4, 2005

(51) Int. Cl.
G06F 3/00 (2006.01)
(52) U.S. Cl. .......................................... 710/2
(58) Field of Classification Search ............... 710/1, 710/8, 100, 305, 306; 361/683, 686
See application file for complete search history.

(56) References Cited

U.S. PATENT DOCUMENTS

| | | | |
|---|---|---|---|
| 5,909,596 A | 6/1999 | Mizuta et al. | |
| 6,062,480 A * | 5/2000 | Evoy | 235/492 |
| 6,107,887 A | 8/2000 | Zucker et al. | |
| 6,124,865 A * | 9/2000 | Meinerth et al. | 345/501 |
| 6,213,815 B1 * | 4/2001 | Wu | 439/638 |
| 6,292,859 B1 | 9/2001 | Santiago | |
| 6,429,903 B1 * | 8/2002 | Young | 348/552 |
| 6,724,389 B1 | 4/2004 | Wilen et al. | |
| 6,864,891 B2 * | 3/2005 | Myers | 345/502 |
| 6,874,042 B2 * | 3/2005 | Sauber | 710/38 |
| 6,888,523 B2 * | 5/2005 | Yamaguchi | 345/87 |
| 2005/0066085 A1 * | 3/2005 | Kobayashi | 710/62 |
| 2005/0083247 A1 * | 4/2005 | Juenger | 345/2.2 |

FOREIGN PATENT DOCUMENTS

EP    1517295 A    3/2005
WO    WO 02/07432 A    1/2002

* cited by examiner

*Primary Examiner*—Kim Huynh
*Assistant Examiner*—Aurangzeb Hassan
(74) *Attorney, Agent, or Firm*—Blakely, Sokoloff, Taylor & Zafman LLP (57) ABSTRACT

An embodiment of the present invention is a technique to map pins on an interface connector to signals for a digital display. A first group of signal traces maps transmitter differential pairs pins in a first group of lanes on the interface connector compatible with a first interface standard to video output points corresponding to video output signals of a first video port compatible with a second interface standard. A second group of signal traces maps presence detect pins in the first group of lanes on the interface connector to control signal points corresponding to control signals of the first video port compatible with the second interface standard. A third group of signal traces maps receiver differential pairs pins in the first group of lanes on the interface connector to video input points corresponding to video input signals of the first video port compatible with the second interface standard.

20 Claims, 8 Drawing Sheets

| PIN # | SIDE B | | SIDE A | |
|---|---|---|---|---|
| | PCI EXPRESS FUNCTION | SDVO/ADD2 FUNCTION | PCI EXPRESS FUNCTION | SDVO/ADD2 FUNCTION |
| 1 | 12V | NC | PRSNT1# | NC |
| 2 | 12V | 12V | 12V | 12V |
| 3 | RSVD | RESERVED | 12V | 12V |
| 4 | GND | GND | GND | GROUND |
| 5 | SMCLK | SMCLK | JTAG2 | RESERVED |
| 6 | SMDATA | SMDATA | JTAG3 | RESERVED |
| 7 | GND | GND | JTAG4 | RESERVED |
| 8 | 3.3V | 3.3V | JTAG5 | RESERVED |
| 9 | JTAG1 | RESERVED | 3.3V | RESERVED |
| 10 | 3.3Vaux | 3.3Vaux | 3.3V | 3.3V |
| 11 | WAKE# | RESERVED | PWGD | POWER GOOD |
| | KEY | | | |

*FIG. 4A*

| PIN # | SIDE B | | SIDE A | |
|---|---|---|---|---|
| | PCI EXPRESS FUNCTION | SDVO/ADD2 FUNCTION | PCI EXPRESS FUNCTION | SDVO/ADD2 FUNCTION |
| 12 | RSVD | RESERVED | GND | NC |
| 13 | GND | GND | REFCLK+ | 12V |
| 14 | HSOp(0) | SDVOB_Red+ | REFCLK- | 12V |
| 15 | HSOn(0) | SDVOB_Red- | GND | GROUND |
| 16 | GND | GND | HSIp(0) | SDVO_TVClkIn+ |
| 17 | PRSNT2# | SDVO_CtrlClk | HSIn(0) | SDVO_TVClkIn- |
| 18 | GND | GROUND | GND | GROUND |
| | END OF x1 CONNECTOR | | | |

*FIG. 4B*

| PIN # | SIDE B | | SIDE A | |
|---|---|---|---|---|
| | PCI EXPRESS FUNCTION | SDVO/ADD2 FUNCTION | PCI EXPRESS FUNCTION | SDVO/ADD2 FUNCTION |
| 19 | HSOp(1) | SDVOB_Green+ | RSVD | RESERVED |
| 20 | HSOn(1) | SDVOB_Green- | GND | GROUND |
| 21 | GND | GROUND | HSIp(1) | SDVOB_Int+ |
| 22 | GND | GROUND | HSIn(1) | SDVOB_Int- |
| 23 | HSOp(2) | SDVOB_Blue+ | GND | GROUND |
| 24 | HSOn(2) | SDVOB_Blue- | GND | GROUND |
| 25 | GND | GROUND | HSIp(2) | SDVO_Stall+ |
| 26 | GND | GROUND | HSIn(2) | SDVO_Stall- |
| 27 | HSOp(3) | SDVOB_Clk+ | GND | GROUND |
| 28 | HSOn(0) | SDVOB_Clk- | GND | GROUND |
| 29 | GND | GROUND | HSIp(3) | NC |
| 30 | RSVD | RESERVED | HSIn(3) | NC |
| 31 | PRSNT2# | SDVO_CtrlData | GND | GROUND |
| 32 | GND | GROUND | RSVD | RESERVED |
| END OF x4 CONNECTOR | | | | |

FIG. 4C

| PIN # | SIDE B | | SIDE A | |
|---|---|---|---|---|
| | PCI EXPRESS FUNCTION | SDVO/ADD2 FUNCTION | PCI EXPRESS FUNCTION | SDVO/ADD2 FUNCTION |
| 33 | HSOp(4) | SDVOC_Red+ | RSVD | RESERVED |
| 34 | HSOn(4) | SDVOC_Red- | GND | GROUND |
| 35 | GND | GND | HSIp(4) | NC |
| 36 | GND | GROUND | HSIn(4) | NC |
| 37 | HSOp(5) | SDVOC_Green+ | GND | GROUND |
| 38 | HSOn(5) | SDVOC_Green- | GND | GROUND |
| 39 | GND | GROUND | HSIp(5) | SDVOC_Int+ |
| 40 | GND | GROUND | HSIn(5) | SDVOC_Int- |
| 41 | HSOp(6) | SDVOC_Blue+ | GND | GROUND |
| 42 | HSOn(6) | SDVOC_Blue- | GND | GROUND |
| 43 | GND | GROUND | HSIp(6) | NC |
| 44 | GND | GROUND | HSIn(6) | NC |
| 45 | HSOp(7) | SDVOC_Clk+ | GND | GROUND |
| 46 | HSOn(7) | SDVOC_Clk- | GND | GROUND |
| 47 | GND | GROUND | HSIp(7) | NC |
| 48 | PRSNT2# | NC | HSIn(7) | NC |
| 49 | GND | GROUND | GND | GROUND |
| END OF x8 CONNECTOR | | | | |

*FIG. 4D*

| PIN # | SIDE B | | SIDE A | |
|---|---|---|---|---|
| | PCI EXPRESS FUNCTION | SDVO/ADD2 FUNCTION | PCI EXPRESS FUNCTION | SDVO/ADD2 FUNCTION |
| 50 | HSOp(8) | NC | RSVD | RESERVED |
| 51 | HSOn(8) | NC | GND | GROUND |
| 52 | GND | GROUND | HSIp(8) | NC |
| 53 | GND | GROUND | HSIn(8) | NC |
| 54 | HSOp(9) | NC | GND | GROUND |
| 55 | HSOn(9) | NC | GND | GROUND |
| 56 | GND | GROUND | HSIp(9) | NC |
| 57 | GND | GROUND | HSIn(9) | NC |
| 58 | HSOp(10) | NC | GND | GROUND |
| 59 | HSOn(10) | NC | GND | GROUND |
| 60 | GND | GROUND | HSIp(10) | NC |
| 61 | GND | GROUND | HSIn(10) | NC |
| 62 | HSOp(11) | NC | GND | GROUND |
| 63 | HSOn(11) | NC | GND | GROUND |
| 64 | GND | GROUND | HSIp(11) | NC |
| 65 | GND | GROUND | HSIn(11) | NC |
| 66 | HSOp(12) | NC | GND | GROUND |
| 67 | HSOn(12) | NC | GND | GROUND |

*FIG. 4E*

| PIN # | SIDE B | | SIDE A | |
|---|---|---|---|---|
| | PCI EXPRESS FUNCTION | SDVO/ADD2 FUNCTION | PCI EXPRESS FUNCTION | SDVO/ADD2 FUNCTION |
| 68 | GND | GROUND | HSIp(12) | NC |
| 69 | GND | GROUND | HSIn(12) | NC |
| 70 | HSOp(13) | NC | GND | GROUND |
| 71 | HSOn(13) | NC | GND | GROUND |
| 72 | GND | GROUND | HSIp(13) | NC |
| 73 | GND | GROUND | HSIn(13) | NC |
| 74 | HSOp(14) | NC | GND | GROUND |
| 75 | HSOn(14) | NC | GND | GROUND |
| 76 | GND | GROUND | HSIp(14) | NC |
| 77 | GND | GROUND | HSIn(14) | NC |
| 78 | HSOp(15) | NC | GND | GROUND |
| 79 | HSOn(15) | NC | GND | GROUND |
| 80 | GND | GROUND | HSIp(15) | NC |
| 81 | PRSNT2# | NC | HSIn(15) | NC |
| 82 | RSVD | RESERVED | GND | GROUND |
| END OF x16 CONNECTOR | | | | |

FIG. 4F

MAPPING SDVO FUNCTIONS FROM PCI EXPRESS INTERFACE

BACKGROUND

1. Field of the Invention

Embodiments of the invention relate to the field of computer systems, and more specifically, to display cards.

2. Description of Related Art

Peripheral Component Interconnect (PCI) Express Base has become increasingly popular in modern computer systems. The PCI Express Base is well suited for use in traditional personal computer (PC), laptop, notebook, mobile computers, and server architectures. Advantages of PCI Express architecture include low pin count, high speed, serial device-to-device interconnect. Therefore, platforms using PCI Express, there is a need for new graphics capabilities. There is, however, no mechanism to make use of a digital display codec using the PCI Express connector. In a typical platform using the PCI Express, the Accelerated Graphics Port (AGP) model is no longer applicable.

Existing techniques to solve the above problem are inadequate. One technique is to place the display codec on the motherboard. This technique is expensive because the motherboards may have to include unnecessary circuitry or space for platforms that do not need a digital display. Furthermore, it creates many significant placement and routing issues in the motherboard design. Another technique is to provide the digital display codec device on the PCI Express card. However, this technique is not desirable because of the incompatibility between the clocking and transfer rates of the PCI Express and the digital codec device. The PCI Express is defined as a fixed frequency interface that requires significant amounts of logic and bandwidth overhead to handle building and decoding packets while digital displays need to have variable clocking and transfer rates and need very little overhead for the transfer of video data.

BRIEF DESCRIPTION OF THE DRAWINGS

Embodiments of the invention may best be understood by referring to the following description and accompanying drawings that are used to illustrate embodiments of the invention. In the drawings.

DESCRIPTION

An embodiment of the present invention is a technique to map pins on an interface connector to signals for a digital display. A first group of signal traces maps transmitter differential pairs pins in a first group of lanes on the interface connector compatible with a first interface standard to video output points corresponding to video output signals of a first video port compatible with a second interface standard. A second group of signal traces maps presence detect pins in the first group of lanes on the interface connector to control signal points corresponding to control signals of the first video port compatible with the second interface standard. A third group of signal traces maps receiver differential pairs pins in the first group of lanes on the interface connector to video input points corresponding to video input signals of the first video port compatible with the second interface standard.

In the following description, numerous specific details are set forth. However, it is understood that embodiments of the invention may be practiced without these specific details. In other instances, well-known circuits, structures, and techniques have not been shown in order not to obscure the understanding of this description.

Figure 1:
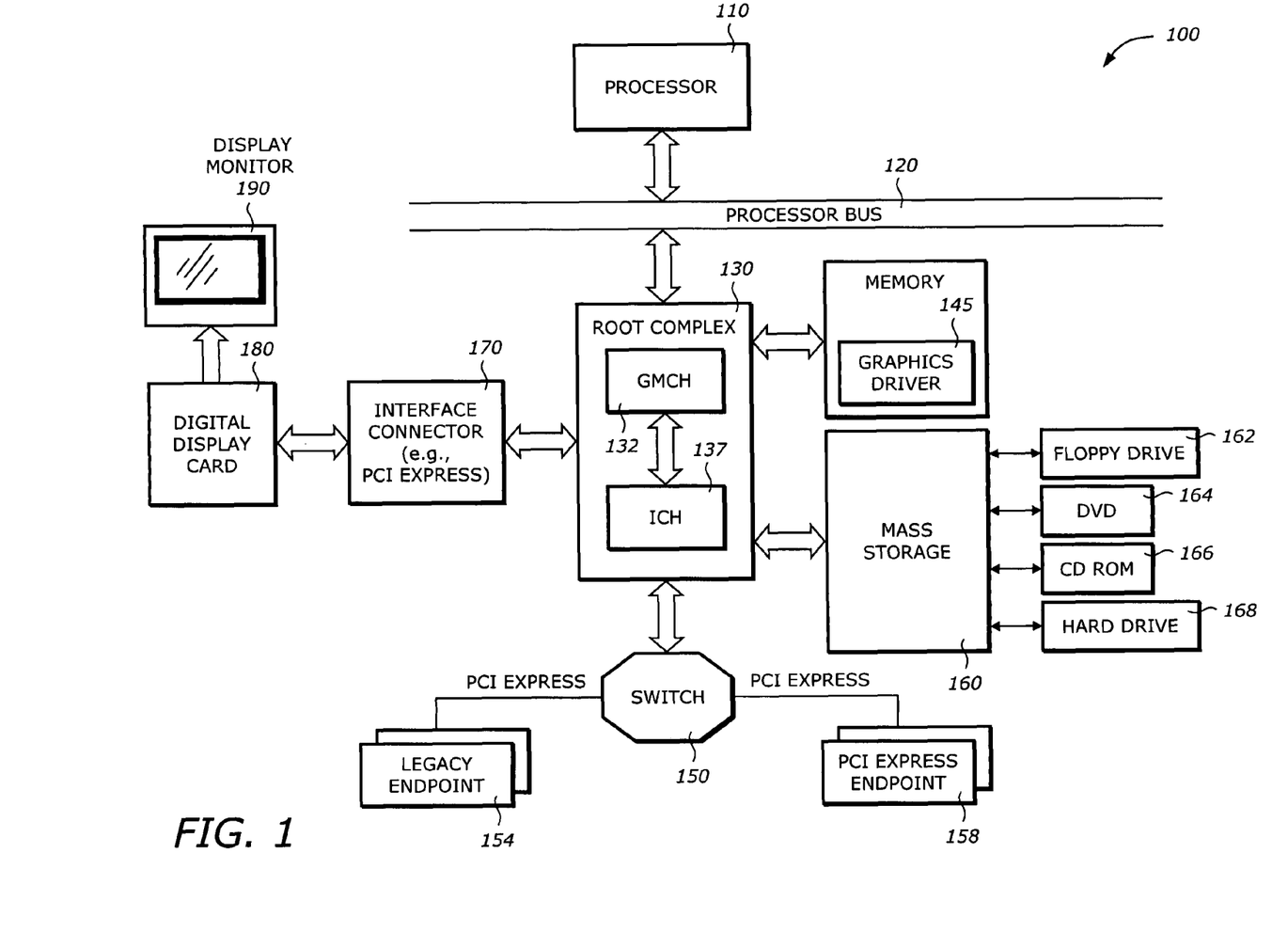
FIG. 1 is a diagram illustrating a system in which one embodiment of the invention can be practiced.

FIG. 1 is a diagram illustrating a system 100 in which one embodiment of the invention can be practiced. The system 100 includes a processor 110, a processor bus 120, a root complex 130, a system memory 140, a switch 150, a mass storage device 160, an interface connector 170, a digital display card 180, and a display monitor 190. Note that the system 100 may include more or fewer elements than these elements.

The processor 110 represents a central processing unit of any type of architecture, such as embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture.

The processor bus 120 provides interface signals to allow the processor 110 to communicate with other processors or devices, e.g., the root complex 130. The processor bus 120 may support a uni-processor or multiprocessor configuration. The processor bus 120 may be parallel, sequential, pipelined, asynchronous, synchronous, or any combination thereof.

The root complex 130 is a root of an input/output (I/O) hierarchy that connects the processor 110 and/or the memory 140 to the I/O devices. The root complex 130 may support one or more interface ports such as Peripheral Component Interconnect (PCI) Express ports. Each interface defines a separate hierarchy domain. Each hierarchy domain may be composed of a single endpoint or a sub-hierarchy containing one or more switch components and endpoints. The root complex may include an integrated graphics memory controller hub (GMCH) chipset 132 and an I/O hub controller (ICH) chipset 137. The GMCH 132 provides control and configuration of memory, graphics, and input/output devices such as the system memory 140 and the ICH 127. The ICH 137 has a number of functionalities that are designed to support I/O functions.

The ICH 137 may also be integrated into a chipset together or separate from the GMCH 132 to perform I/O functions. The ICH 137 may include a number of interface and I/O functions such as PCI bus interface, processor interface, interrupt controller, direct memory access (DMA) controller, power management logic, timer, system management bus (SMBus), universal serial bus (USB) interface, mass storage interface, low pin count (LPC) interface, etc.

The system memory 140 stores system code and data. The system memory 140 is typically implemented with dynamic random access memory (DRAM) or static random access memory (SRAM). The system memory may include program code or code segments implementing one embodiment of the invention. The system memory includes a graphics driver 145. Any one of the elements of the graphics driver 145 may be implemented by hardware, software, firmware, microcode, or any combination thereof. The system memory 140 may also include other programs or data which are not shown, such as an operating system.

The switch 150 is a logical assembly of multiple virtual PCI-to-PCI bridge devices. It appears to the configuration software as two or more logical PCI-to-PCI bridges. The switch 150 provides PCI Express interface to legacy endpoints 154 and PCI Express endpoints 158. An endpoint is a type of device that can be a requester or completer of a PCI Express transaction.

The mass storage device 160 stores archive information such as code, programs, files, data, applications, and operating systems. The mass storage device 160 may include floppy drive 162, a digital video/versatile disc (DVD) 164, a compact disk (CD) Read Only Memory (ROM) 166, and a hard drive 168, and any other magnetic or optical storage device. The mass storage device 160 provides a mechanism to read machine-accessible media. The machine-accessible media may contain computer readable program code to perform tasks as described below.

The interface connector 170 is a connector attached to the motherboard that contains the processor 110, the root complex 130, the memory 140, and other devices. The interface connector 170 is compatible with an interface standard. In one embodiment, the interface standard is the PCI Express as described in the PCI Express Base Specification Revision 1.0 and PCI Express Card Electromechanical Specification Revision 1.0, both published by the PCI Special Interest Group (PCI-SIG), dated Jul. 22, 2002.

The digital display card 180 contains circuitry and/or devices that provide display signals to drive the display monitor 190. The digital display card 180 is plugged into the interface connector 170 to interact with the GMCH 132 in the root complex 130. In one embodiment, the digital display card 180 is compatible with a suitable serial digital video output (SDVO) display format. It contains an SDVO device that generates the digital display signals. In one embodiment, the digital display card 180 may be referred to as an Accelerated Graphics Port (AGP) Digital Display second generation (ADD2).

The display monitor 190 is a monitor that may be analog or digital. It may be a flat panel display such as Liquid Crystal Display (LCD), electroluminescent display (ELD), gasplasma display, or a Cathode Ray Tube (CRT) display, or a television (TV) set.

One embodiment of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, a method of manufacturing or fabrication, etc. A flowchart may also describe an iteration in a loop.

One embodiment of the invention is a technique to provide an add-on card to be plugged into a PCI Express connector on a motherboard and provide SDVO functionalities. The add-on card does not contain a PCI Express-compatible device. It contains a SDVO-compatible device that can generate digital display signals to drive a display monitor. The motherboard typically contains a graphics chipset that supports SDVO. If the add-on card is plugged into a motherboard that supports either PCI Express or SDVO through the interface connector, the add-on card can be used as a digital display path upgrade. If the motherboard only supports the PCI Express but not the SDVO standard, the card is neither harmed nor causes harm to other devices or the system. The PCI Express provides independent low speed and low pin count digital interface via the control bus to communicate with devices on the add-on card.

The graphics chipset is typically an integrated Graphics Memory Controller Hub (GMCH) chipset that may support one or more SDVO ports. The multiplexed bus signals from the GMCH come across the high speed digital interface to the interface connector to support the add-on card in either PCI Express mode or SDVO mode. There is a card sense signal using pull-up/down strapping at a strapping point on the interface connector 170. The strapping is used to differentiate between a SDVO compatible card and a PCI Express compatible card. The GMCH has two circuit components: an SDVO circuitry and a PCI Express circuitry. If the strapping is at a $V_{STRAP}$ level (e.g., HIGH), the GMCH disables its PCI Express circuitry and enables its SDVO circuitry to communicate with the add-on card having an SDVO device. If the strapping is not at a $V_{STRAP}$ level (e.g., LOW), the GMCH disables its SDVO circuitry and enables its PCI Express circuitry to communicate with the add-on card having a PCI Express device. The add-on card described as one embodiment of the invention provides digital display codec devices compatible with the SDVO signaling and external/internal display interconnections such as CRT, TV, high definition television (HDTV), digital visual interface (DVI), etc. To provide support for the add-on card, there is graphics controller software including the video basic input/output system (BIOS) and/or graphics device drivers such as the graphics driver 145.

Figure 2:
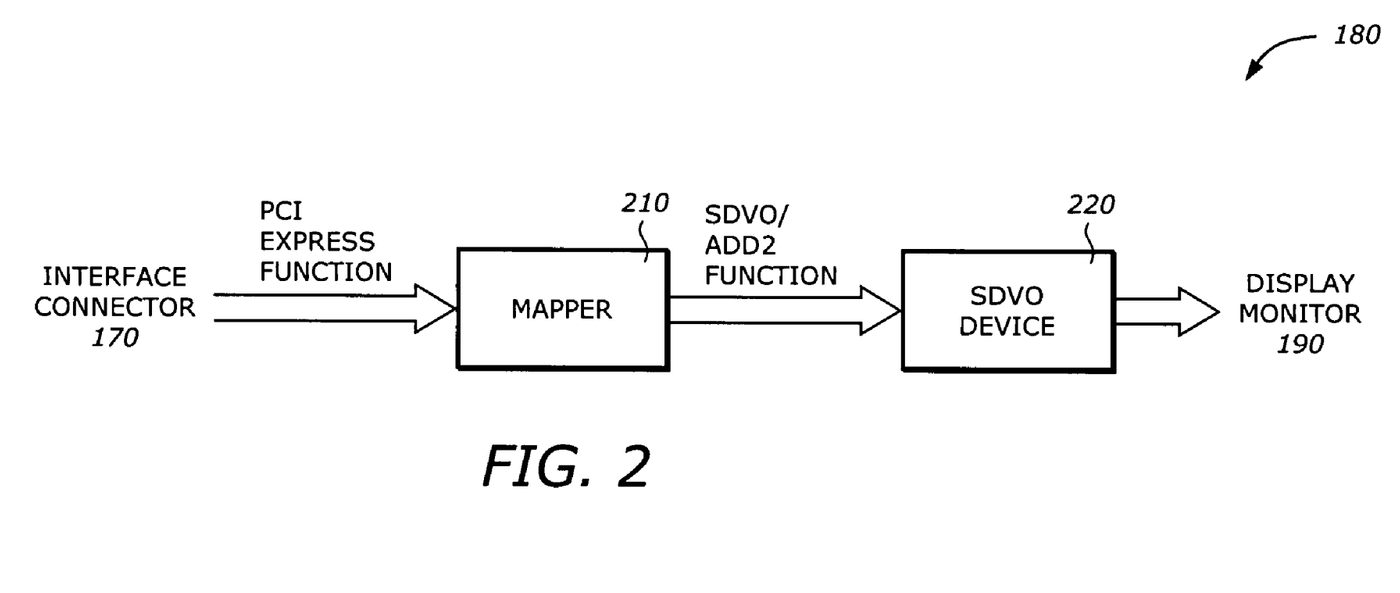
FIG. 2 is a diagram illustrating a digital display card according to one embodiment of the invention.

FIG. 2 is a diagram illustrating the digital display card 180 according to one embodiment of the invention. The digital display card 180 includes a mapper 210 and an SDVO device 220.

The mapper 210 maps the PCI Express functions on the interface connector 170 to SDVO functions. The PCI Express functions and the SDVO functions can be grouped into several corresponding groups. The mapper 210 is in essence a pin assignment of the SDVO functions to the PCI Express pins on the interface connector 170. The mapper 210 may perform the mapping in a fixed or static manner or in a dynamic manner to electrically connect the PCI Express pins to the corresponding SDVO points on the card. In the static manner, the mapping may include hardwired or signal traces that connect the PCI Express pins on the connector to the corresponding SDVO points. The connections may be mechanically direct or may go through fixed switches, either mechanical switches or electronic switches. In the dynamic manner, the connections are done dynamically such as by using a programmable switch or switches that connect the PCI Express pins to signal traces that connect to the corresponding SDVO points. The programmable switches may be programmed to connect the PCI Express pins to another set of points on the card that correspond to another interface standard to provide further interface flexibility.

The SDVO device 220 is a device that generates digital video output signals from the serial SDVO signals as mapped to the PCI Express, to the display monitor 190. The SDVO device may include or be interfaced to a digital display codec device.

Figure 3:
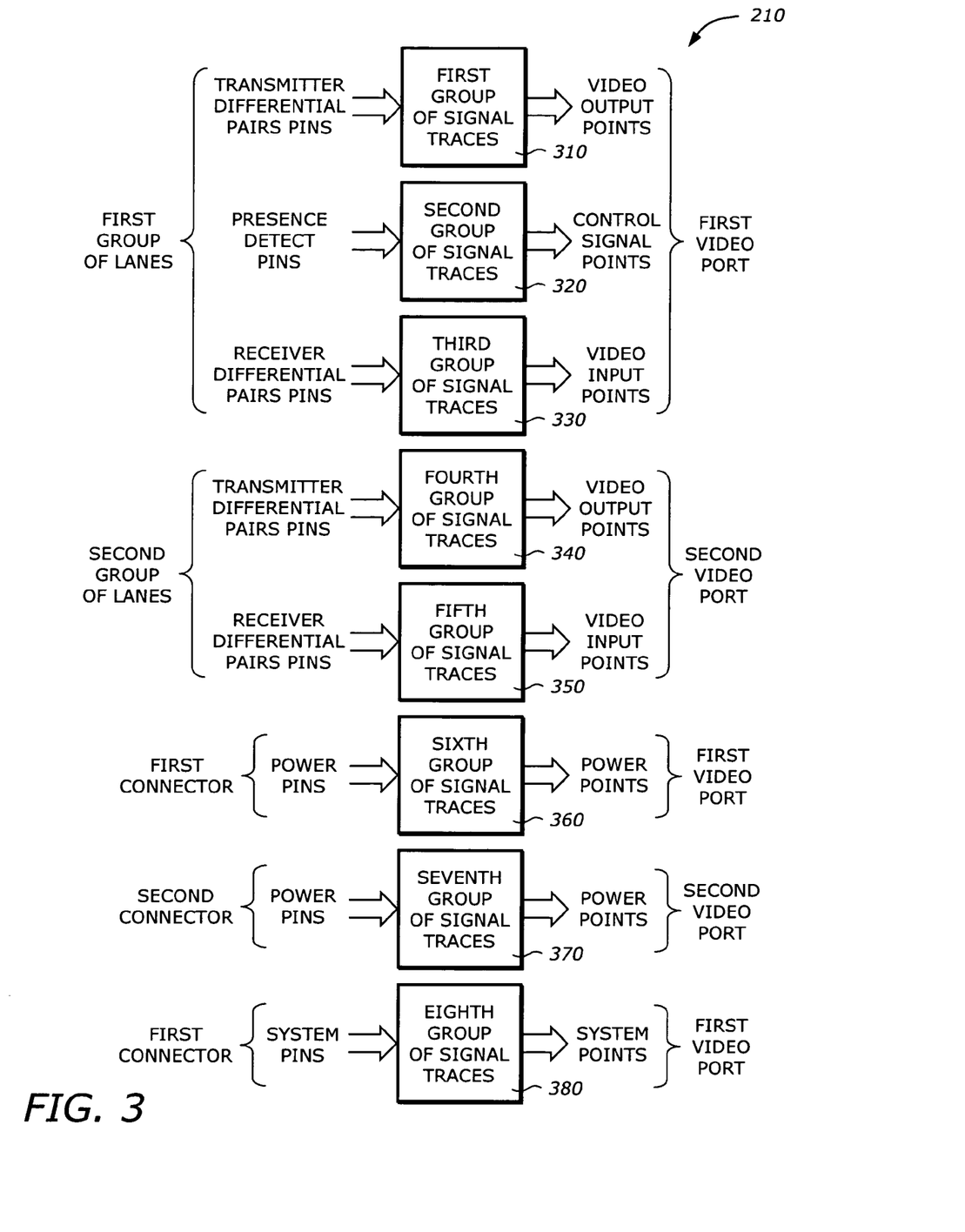
FIG. 3 is a diagram illustrating a mapper according to one embodiment.

FIG. 3 is a diagram illustrating the mapper 210 according to one embodiment of the invention. The mapper 210 includes first, second, third, fourth, fifth, sixth, seventh, and eighth groups of signal traces 310, 320, 330, 340, 350, 360, 370, and 380, respectively. Each group may or may nor include a fixed or programmable switch. The first, second, and third group correspond to the first group of lanes and the first video port. The fourth and fifth group correspond to the second group of lanes and the second video port. The sixth and eighth group correspond to the first connector and the first video port. The seventh group correspond to the second connector and the second video port.

The first group 310 of signal traces maps the transmitter differential pairs pins in a first group of lanes on the interface connector compatible with a first interface standard to the video output points corresponding to video output signals of a first video port compatible with a second interface standard. In one embodiment, the first interface standard is the PCI Express and the second interface standard is the SDVO standard. In the following discussion, for simplicity, the PCI Express and the SDVO standards are employed although other standards can be used without deviating from the spirit and scope of the invention. In this embodiment, the transmitter differential pairs pins are the HSOp(0), HSOn(0), HSOp(1), HSOn(1), HSOp(2), HSOn(2), HSOp(3), and HSOn(3) at pins 14, 15, 19, 20, 23, 24, and 27, and 28 of side B, respectively. The first group of lanes are lanes 0, 1, 2, and 3. The video output signals are the SDVO red, green, blue, and clock signals of the first SDVO port or channel.

The second group 320 of signal traces maps the presence detect pins in the first group of lanes on the interface connector to control signal points corresponding to control signals of the first video port compatible with the second interface standard. The detect pins are PRSNT2# at pins 17 and 31 of side B. The control signals are the SDVO control clock and control data signals of the first SDVO port or channel.

The third group 330 of signal traces maps the receiver differential pairs pins in the first group of lanes on the interface connector to video input points corresponding to video input signals of the first video port compatible with the second interface standard. The receiver differential pairs pins are the HSIp(0), HSIn(0), HSIp(1), HSIn(1), HSIp(2), and HSIn(2), at pins 16, 17, 21, 22, 25, and 26 of side A, respectively. Note that the HSIp(3), and HSIn(3) are not mapped and the pins are left unconnected. The video input signals are the SDVO clock, interrupt, and stall signals of the first SDVO port or channel.

The fourth group 340 of signal traces maps transmitter differential pairs pins in a second group of lanes on the interface connector to video output points corresponding to video output signals of a second video port compatible with the second interface standard. The transmitter differential pairs pins are the HSOp(4), HSOn(4), HSOp(5), HSOn(5), HSOp(6), HSOn(6), HSOp(7), and HSOn(7) at pins 33, 34, 37, 38, 41, 42, 45, and 46 of side B, respectively. The second group of lanes are lanes 4, 5, 6, and 7. The video output signals are the SDVO red, green, blue, and clock signals of the second SDVO port or channel.

The fifth group 350 of signal traces maps receiver differential pairs pins in a second group of lanes on the interface connector to video input points corresponding to video input signals of the second video port compatible with the second interface standard. The receiver differential pairs pins are the HSIp(5) and HSIn(5) at pins 39 and 40 of side A, respectively. Note that the HSIp(4), HSIn(4), HSIp(6), HSIn(6), HSIp(7), and HSIn(7) are not mapped and the pins are left unconnected. The video input signals are the SDVO interrupt signals of the second SDVO port or channel.

The sixth group 360 of signal traces maps the power pins on a first connector of the interface connector to power points of the first video port. The first connector includes the x4 form factor of the PCI Express. The power pins include all the various power and ground pins from pins 1 through pins 32 of both sides A and B.

The seventh group 370 of signal traces maps the power pins on a second connector of the interface connector to power points of the second video port. The second connector includes the x8 form factor of the PCI Express. The power pins include all the various power and ground pins from pins 1 through pins 49 of both sides A and B.

The eighth group 380 of signal traces maps the system pins on a first connector of the interface connector to system points of the first video port. The system pins are the SMCLK, SMDATA, and PWGD at pins 5 and 6 of side B and pin 11 of side A, respectively.

The above mapping allows complete functionalities for one SDVO video port using the x4 PCI Express card form factor, and complete functionalities for two SDVO video ports using the x8 PCI Express card form factor.

Note that if lanes 8 through 16 are not mapped. The pins corresponding to the signals are left unconnected. The power pins, however, are mapped to the corresponding power pins of the add-on card.

The details of the mapping or correspondence between the PCI Express pins and the SDVO signals are shown in FIGS. 4A, 4B, 4C, 4D, 4E, and 4F.

Figure 4A:
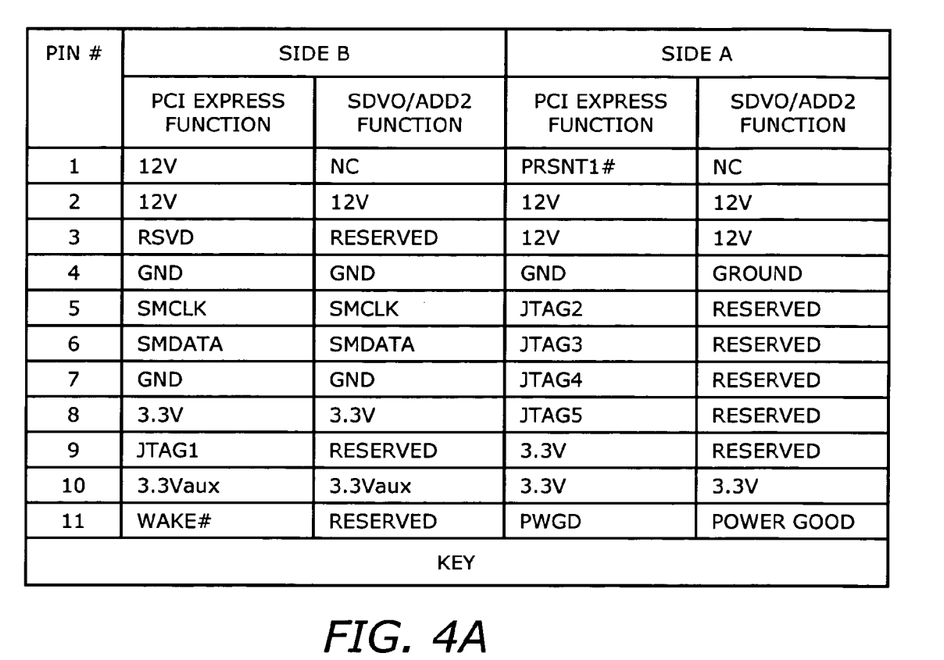
FIG. 4A is a diagram illustrating a mapping between PCI Express functions to SDVO functions on the key portion of the interface connector according to one embodiment of the invention.

FIG. 4A is a diagram illustrating a mapping between PCI Express functions to SDVO functions on the key portion of the interface connector according to one embodiment of the invention.

Figure 4B:
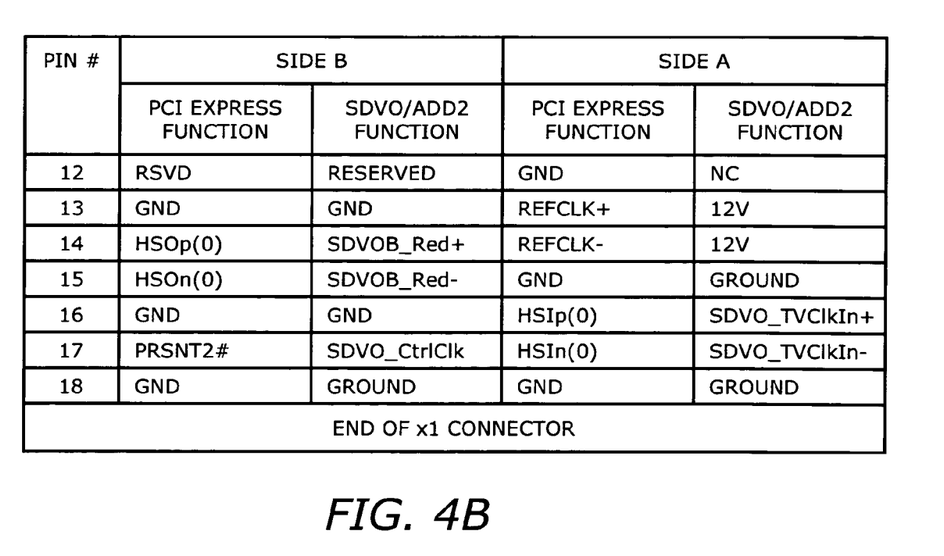
FIG. 4B is a diagram illustrating a mapping between PCI Express functions to SDVO functions on the x1 connector of the interface connector according to one embodiment of the invention.

FIG. 4B is a diagram illustrating a mapping between PCI Express functions to SDVO functions on the x1 connector of the interface connector according to one embodiment of the invention.

Figure 4C:
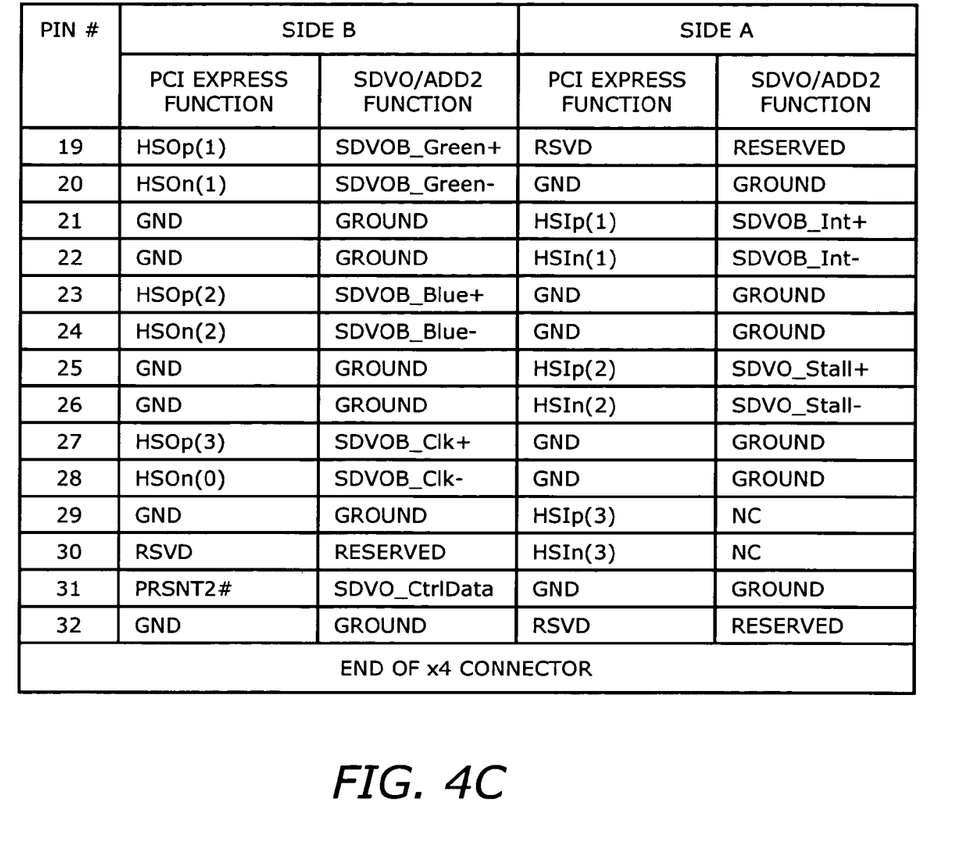
FIG. 4C is a diagram illustrating a mapping between PCI Express functions to SDVO functions on the x4 connector of the interface connector according to one embodiment of the invention.

FIG. 4C is a diagram illustrating a mapping between PCI Express functions to SDVO functions on the x4 connector of the interface connector according to one embodiment of the invention.

Figure 4D:
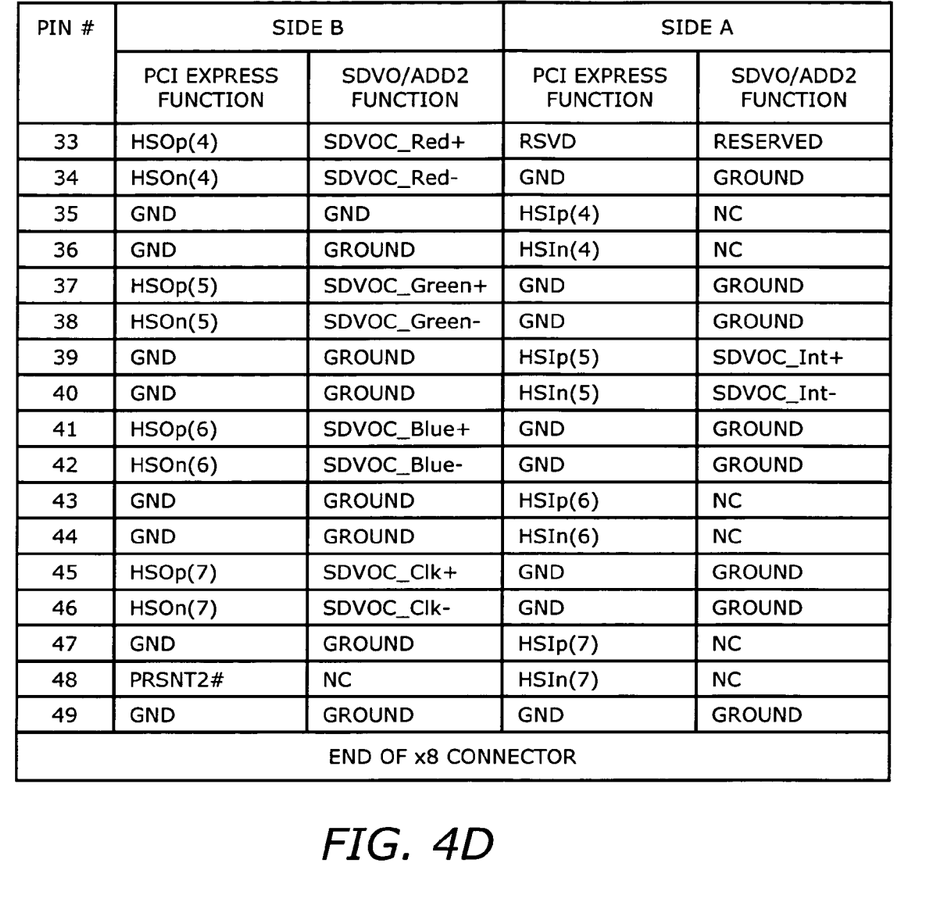
FIG. 4D is a diagram illustrating a mapping between PCI Express functions to SDVO functions on the x8 connector of the interface connector according to one embodiment of the invention.

FIG. 4D is a diagram illustrating a mapping between PCI Express functions to SDVO functions on the x8 connector of the interface connector according to one embodiment of the invention.

Figure 4E:
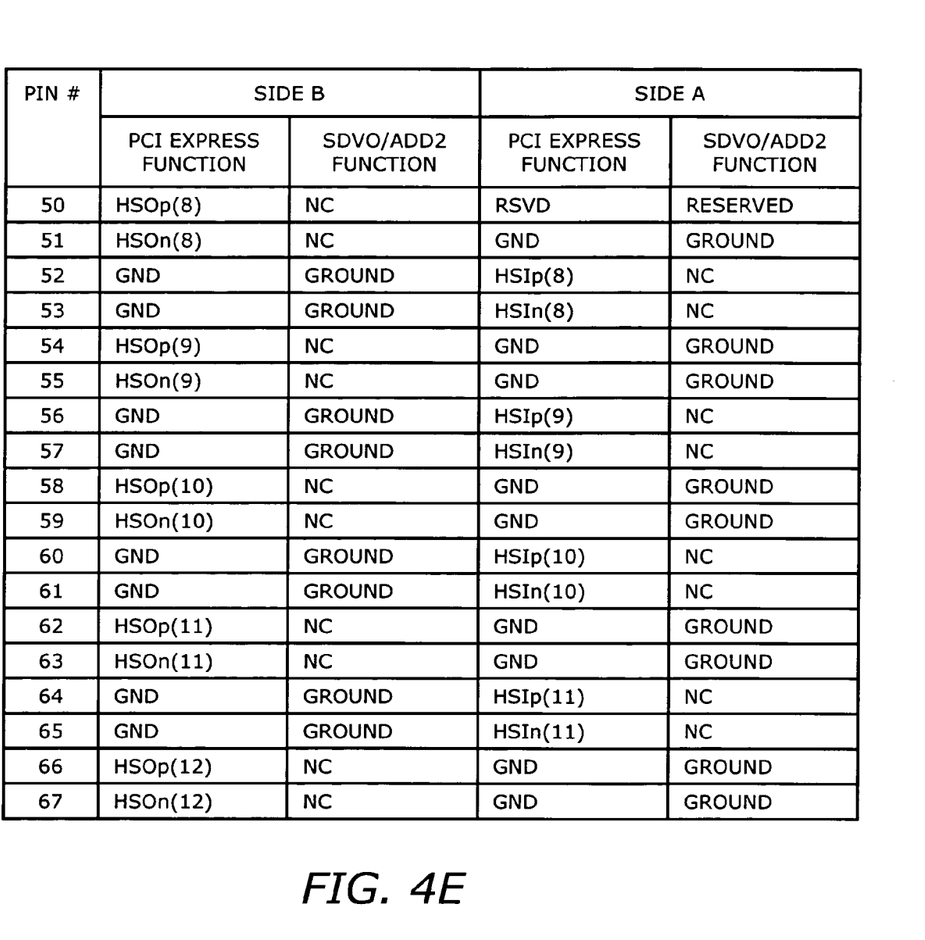
FIG. 4E is a diagram illustrating a mapping between PCI Express functions to SDVO functions on a first portion of the x16 connector of the interface connector according to one embodiment of the invention.

FIG. 4E is a diagram illustrating a mapping between PCI Express functions to SDVO functions on a first portion of the x16 connector of the interface connector according to one embodiment of the invention.

Figure 4F:
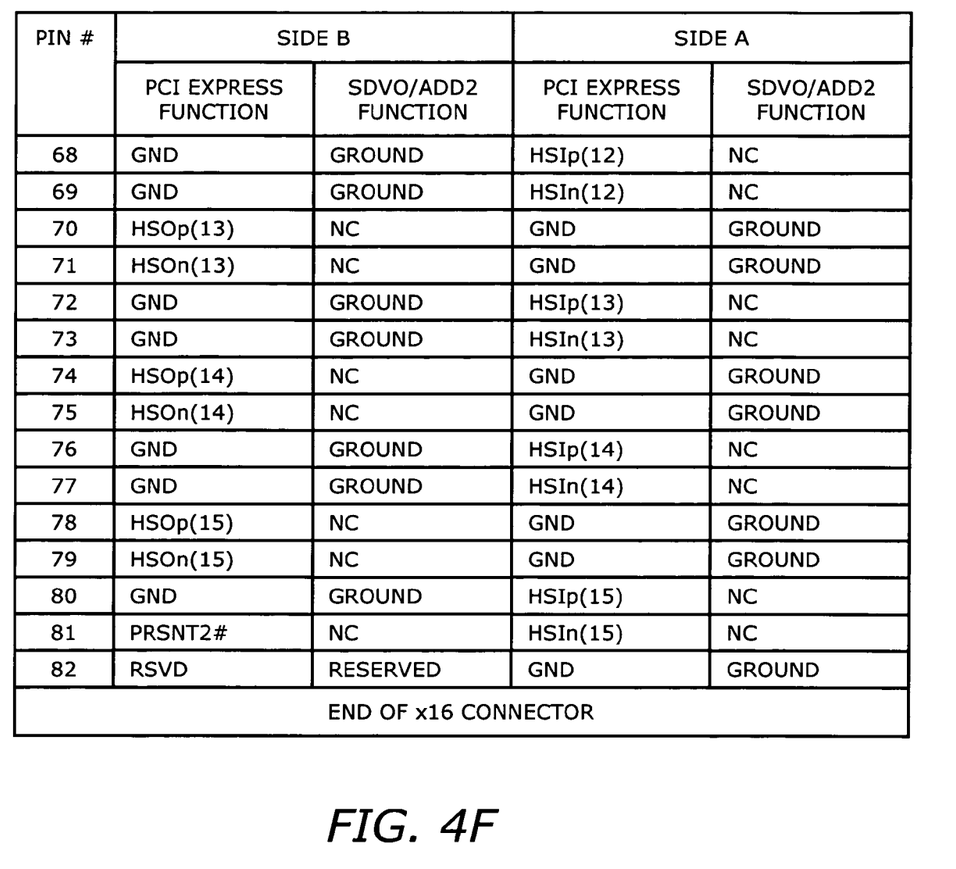
FIG. 4F is a diagram illustrating a mapping between PCI Express functions to SDVO functions on a second portion of the x16 connector of the interface connector according to one embodiment of the invention.

FIG. 4F is a diagram illustrating a mapping between PCI Express functions to SDVO functions on a second portion of the x16 connector of the interface connector according to one embodiment of the invention.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
   mapping transmitter differential pairs pins in a first group of lanes on an interface connector compatible with a first interface standard to video output points via a first group of signal traces, the video output points corresponding to video output signals of a first video port compatible with a second interface standard;

mapping presence detect pins in the first group of lanes on the interface connector to control signal points via a second group of signal traces, the control signal points corresponding to control signals of the first video port compatible with the second interface standard; and mapping receiver differential pairs pins in the first group of lanes on the interface connector to video input points via a third group of signal traces, the video input points corresponding to video input signals of the first video port compatible with the second interface standard.

2. The method of claim 1 further comprising:

mapping transmitter differential pairs pins in a second group of lanes on the interface connector to video output points via a fourth group of signal traces, the video output points corresponding to video output signals of a second video port compatible with the second interface standard; and mapping receiver differential pairs pins in a second group of lanes on the interface connector to video input points via a fifth group of signal traces, the video input points corresponding to video input signals of the second video port compatible with the second interface standard.

3. The method of claim 1 wherein the first interface standard is compatible with a peripheral component interconnect (PCI) Express standard.

4. The method of claim 1 wherein the second interface standard is compatible with a serial digital video output (SDVO) standard.

5. The method of claim 1 further comprising:

mapping power pins on a first connector of the interface connector to power points of the first video port via a sixth group of signal traces.

6. The method of claim 2 further comprising:

mapping power pins on a second connector of the interface connector to power points of the second video port via a seventh group of signal traces.

7. The method of claim 4 wherein the video output signals include pairs of red, green, blue, and clock signals.

8. The method of claim 4 wherein the control signals include a control clock signal and a control data signal.

9. The method of claim 4 wherein the video input signals include pairs of input clock signals, interrupt signals, and stall signals.

10. The method of claim 1 further comprising:

mapping system pins on a first connector of the interface connector to system points of the first video port via an eighth group of signal traces.

11. A system comprising:

a graphics chipset on a motherboard;

an interface connector attached to the motherboard and compatible with a first interface standard; and a card plugged into the interface connector to drive a display monitor, the card comprising:

a first group of signal traces to map transmitter differential pairs pins in a first group of lanes on an interface connector compatible with a first interface standard to video output points corresponding to video output signals of a first video port compatible with a second interface standard, a second group of signal traces to map presence detect pins in the first group of lanes on the interface connector to control signal points corresponding to control signals of the first video port compatible with the second interface standard, and a third group of signal traces to map receiver differential pairs pins in the first group of lanes on the interface connector to video input points corresponding to video input signals of the first video port compatible with the second interface standard.

12. The system of claim 11 wherein the card further comprises:

a fourth group of signal traces to map transmitter differential pairs pins in a second group of lanes on the interface connector to video output points corresponding to video output signals of a second video port compatible with the second interface standard; and a fifth group of signal traces to map receiver differential pairs pins in a second group of lanes on the interface connector to video input points corresponding to video input signals of the second video port compatible with the second interface standard.

13. The system of claim 11 wherein the first interface standard is compatible with a peripheral component interconnect (PCI) Express standard.

14. The system of claim 11 wherein the second interface standard is compatible with a serial digital video output (SDVO) standard.

15. The system of claim 11 wherein the card further comprises:

a sixth group of signal traces to map power pins on a first connector of the interface connector to power points of the first video port.

16. The system of claim 12 wherein the card further comprises:

a seventh group of signal traces to map power, pins on a second connector of the interface connector to power points of the second video port.

17. The system of claim 14 wherein the video output signals include pairs of red, green, blue, and clock signals.

18. The system of claim 14 wherein the control signals include a control clock signal and a control data signal.

19. The system of claim 14 wherein the video input signals include pairs of input clock signals, interrupt signals, and stall signals.

20. The system of claim 11 wherein the card further comprises:

an eighth group of signal traces to map system pins on a first connector of the interface connector to system points of the first video port.

* * * * *